US012791519B2

(12) United States Patent
Takane et al.

(10) Patent No.: US 12,791,519 B2
(45) Date of Patent: Nov. 10, 2026

(54) ELECTROPHORESIS UNIT AND ELECTROPHORESIS METHOD

(71) Applicant: ARKRAY, Inc., Kyoto (JP)

(72) Inventors: Eri Takane, Kyoto (JP); Chiaki Miyamoto, Kyoto (JP); Yasumasa Honda, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 183 days.

(21) Appl. No.: 18/930,374

(22) Filed: Oct. 29, 2024

(65) Prior Publication Data

US 2025/0137966 A1 May 1, 2025

(30) Foreign Application Priority Data

Oct. 30, 2023 (JP) ................................. 2023-185912

(51) Int. Cl.
*G01N 27/447* (2006.01)

(52) U.S. Cl.
CPC . *G01N 27/44743* (2013.01); *G01N 27/44713* (2013.01); *G01N 27/44791* (2013.01)

(58) Field of Classification Search
None
See application file for complete search history.

(56) References Cited

U.S. PATENT DOCUMENTS

2005/0161402 A1 7/2005 Hanafusa et al.
2009/0107843 A1 4/2009 Hanafusa et al.

FOREIGN PATENT DOCUMENTS

JP 2005-214710 A 8/2005
JP 2017-161233 A 9/2017

*Primary Examiner* — J. Christopher Ball
(74) *Attorney, Agent, or Firm* — Morgan, Lewis & Bockius LLP

(57) ABSTRACT

An electrophoresis unit including: a capillary flow path (CFP) through which a sample solution (SS) moves when the CFP is filled with a running solution (RS); a pair of electrodes installed near both ends of the CFP; a detector provided at an intermediate part of the CFP; a first flow path (FFP) and a second flow path (SFP) communicating with the both sides of the CFP, respectively; a first supply source (FSS) supplying the SS to the FFP; a second supply source (SSS) supplying the RS to the SFP; a pump moving the RS from the SSS to the SFP and moving the SS from the FSS to the FFP; a first auxiliary supply source supplying insulating fluid to the FFP; a second auxiliary supply source supplying insulating fluid to the SFP; and a switch switching a fluid path of fluid supplied to the FFP and the SFP.

14 Claims, 14 Drawing Sheets

ELECTROPHORESIS UNIT AND ELECTROPHORESIS METHOD

CROSS-REFERENCE TO RELATED APPLICATION

This application claims priority under 35 USC 119 from Japanese Patent Application No. 2023-185912, filed on Oct. 30, 2023, the disclosures of which are incorporated by reference herein.

BACKGROUND

Technical Field

The present disclosure relates to a method and a device for filling a capillary with a running solution and a sample solution when capillary electrophoresis is performed.

Related Art

In a device for performing capillary electrophoresis, various techniques are disclosed regarding a method for filling a capillary with a running solution and a sample solution. For example, as in the technique described in Japanese Patent Application Laid-Open (JP-A) No. 2005-214710, a structure of a microchip in which reservoirs for storing liquid are provided at both ends of a separation flow path, and a separation buffer solution and a sample are supplied to the reservoirs at both ends, is common in capillary electrophoresis. In the technique described in JP-A No. 2005-214710, since the amount of liquid flowing through the separation flow path cannot exceed the volume of the reservoirs, it is necessary to repeat a process of supplying liquid to the reservoirs or aspirating liquid from the reservoirs for sufficient cleaning.

In the technique described in Japanese Patent Application Laid-Open (JP-A) No. 2017-161233, a dispensing probe and an aspirating nozzle are inserted into reservoirs at both ends of a flow path, and a liquid is continuously discharged and aspirated, so that the repetitive operation as in JP-A No. 2005-214710 is omitted.

SUMMARY

When flow paths through which a sample solution and a running solution flow are provided at an upstream side and a downstream side of a capillary without a reservoir structure, respectively, a liquid amount does not depend on the volume of the reservoirs. However, since electrodes are provided at both ends of the capillary, it is necessary to prevent electric leakage to a flow path.

An electrophoresis unit according to one aspect of the disclosure includes: a capillary flow path through which a sample solution moves from an upstream side to a downstream side in a state in which the capillary flow path is filled with a running solution; a pair of electrodes installed near both ends of the capillary flow path; a detector provided at an intermediate part of the capillary flow path; a first flow path, an intermediate part of which communicates with the upstream side of the capillary flow path, the first flow path extending in a direction intersecting a longitudinal direction of the capillary flow path; a second flow path, an intermediate part of which communicates with the downstream side of the capillary flow path, the second flow path extending in the direction intersecting the longitudinal direction of the capillary flow path; a first supply source configured to supply the sample solution to the first flow path; a second supply source configured to supply the running solution to the second flow path; a pump configured to move the running solution from the second supply source to the second flow path and to move the sample solution from the first supply source to the first flow path; a first auxiliary supply source configured to supply, to the first flow path, insulating fluid that insulates the sample solution in contact with the electrode in the first flow path; a second auxiliary supply source configured to supply, to the second flow path, insulating fluid that insulates the running solution in contact with the electrode in the second flow path; and a switch configured to switch between supply and stop of fluid at least from the first supply source and the second supply source to the first flow path and the second flow path.

According to an embodiment of the present disclosure, electrophoresis is performed in a state in which flow paths through which the sample solution and the running solution flow are provided at each of the upstream side and the downstream side of the capillary without a reservoir structure, and each of the sample solution in the flow path at the upstream side and the running solution in the flow path at the downstream side is interposed in the insulating fluid, so that it is possible to prevent electric leakage to the flow path through the electrodes provided at both ends of the capillary.

BRIEF DESCRIPTION OF THE DRAWINGS

Exemplary embodiments will be described in detail based on the following figures, wherein.

DETAILED DESCRIPTION

Figure 1A:
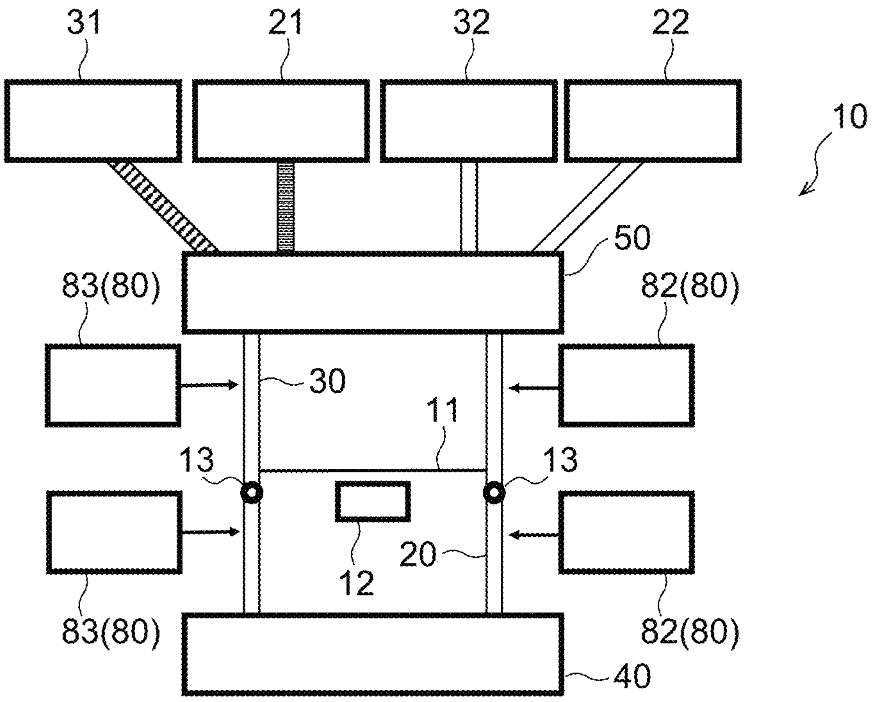
FIG. 1A is a schematic view illustrating an overview of an electrophoresis unit of a first embodiment.

Hereinafter, embodiments in the disclosure will be described with reference to the drawings. The same reference numerals in the drawings indicate the same portions without any particular description. Moreover, the respective members and parts illustrated in each of the drawings are merely schematically illustrated, and the size and positional relationship of actual products are not necessarily accurately illustrated. In each of the drawings referred to below, the right side of a capillary flow path 11 is defined as an upstream side, and the left side is defined as a downstream side.

(1) First Embodiment

A first embodiment of the present disclosure will be described with reference to FIG. 1A to FIG. 1E. FIG. 1A is a schematic view illustrating an overview of an electrophoresis unit 10 of the first embodiment. Moreover, FIG. 1B to FIG. 1E schematically illustrate a schematic procedure until a capillary flow path 11 is filled with a running solution RS, and a sample solution SS is introduced into the capillary flow path 11 by the start of electrophoresis in the present embodiment.

The electrophoresis unit 10 according to the present embodiment of the present disclosure, includes: the capillary flow path 11 through which a sample solution SS moves from an upstream side to downstream side in a state in which the capillary flow path 11 is filled with a running solution RS; a pair of electrodes 13 installed near both ends of the capillary flow path 11; a detector 12 provided at an intermediate part of the capillary flow path 11; a first flow path 20, an intermediate part of which communicates with the upstream side of the capillary flow path 11, the first flow path 20 extending in a direction intersecting a longitudinal direction of the capillary flow path 11; a second flow path 30, an intermediate part of which communicates with the downstream side of the capillary flow path 11, the second flow path 30 extending in the direction intersecting the longitudinal direction of the capillary flow path 11; a first supply source 21 configured to supply the sample solution SS to the first flow path 20; a second supply source 31 configured to supply the running solution RS to the second flow path 30; a pump 40 configured to move the running solution RS from the second supply source 31 to the second flow path 30 and to move the sample solution SS from the first supply source 21 to the first flow path 20; a first auxiliary supply source 22 configured to supply, to the first flow path 20, insulating fluid IF that insulates the sample solution SS in contact with the electrode 13 in the first flow path 20; a second auxiliary supply source 32 configured to supply, to the second flow path 30, insulating fluid IF that insulates the running solution RS in contact with the electrode 13 in the second flow path 30; and a switch 50 configured to switch between supply and stop of fluid at least from the first supply source 21 and the second supply source 31 to the first flow path 20 and the second flow path 30.

The capillary flow path 11 is a capillary tube into which liquid is introduced by using a capillary phenomenon, or by pressurizing or aspirating, and is formed of a translucent material such as glass or transparent plastic. In the electrophoresis unit 10, in a state in which the capillary flow path 11 is filled with the running solution RS, a voltage is applied via the pair of electrodes 13 installed near both ends of the capillary flow path 11, so that the sample solution SS moves in the direction to the opposite end in the capillary flow path 11. In the present disclosure, a side at which the sample solution SS is supplied to the capillary flow path 11 is referred to as an upstream side, and a side to which the sample solution SS moves is referred to as downstream side.

The running solution RS is, for example, a buffer solution or the like that is variously selected depending on the purpose of electrophoresis. The sample solution SS is, for example, a liquid sample collected from a living body, such as blood, plasma, saliva, and urine, and is preferably diluted to a suitable concentration with an appropriate buffer solution or the like according to the condition of electrophoresis.

The detector 12 is a device that optically detects a separated component of the sample solution SS having been moved, at the intermediate part of the capillary flow path 11. The first flow path 20 is a flow path through which the sample solution SS is supplied from the first supply source 21 to an upstream end of the capillary flow path 11 by the pump 40. The first flow path 20 intersects with the longitudinal direction of the capillary flow path 11, extends in any direction (preferably, a direction orthogonal to the longitudinal direction of the capillary flow path 11), and communicates with the upstream end of the capillary flow path 11 at the intermediate part of the first flow path 20. The first supply source 21 can be implemented with, for example, a reservoir or a syringe capable of temporarily storing the sample solution SS. An excess sample solution SS is discharged from an end of the first flow path 20 (i.e., from a side opposite to the first supply source 21). The pump 40 may be provided at either a supply side or a discharge side of first flow path 20, or may be provided at both sides. In a case in which the pump 40 is provided at the supply side, the pump 40 moves the sample solution SS to the first flow path 20. In a case in which the pump 40 is provided at the discharge side, the pump 40 aspirates the sample solution SS from the first flow path 20. In either case, the sample solution SS moves from the first supply source 21 to the first flow path 20.

The second flow path 30 is a flow path through which the running solution RS is supplied from the second supply source 31 to a downstream end and the inside of the capillary flow path 11 by the pump 40. The second flow path 30 intersects with the longitudinal direction of the capillary flow path 11, extends in any direction (preferably, a direction orthogonal to the longitudinal direction of the capillary flow path 11), and communicates with the downstream end of the capillary flow path 11 at the intermediate part of the second flow path 30. The second supply source 31 can be implemented with, for example, a reservoir or a syringe capable of temporarily storing the running solution RS. An excess running solution RS is discharged from an end of the second flow path 30 (i.e., from a side opposite to the second supply source 31). The pump 40 may be provided at either a supply side or a discharge side of the second flow path 30, or may be provided at both sides. In a case in which the pump 40 is provided at the supply side, the pump 40 moves the running solution RS to the second flow path 30. In a case in which the pump 40 is provided at the discharge side, the pump 40 aspirates the running solution RS from the second flow path 30. In either case, the running solution RS moves from the second supply source 31 to the second flow path 30. In the present embodiment, the pump 40 is provided at the discharge side of the first flow path 20 and the second flow path 30.

The insulating fluid IF is fluid having insulating properties used for blocking, in the first flow path 20 and the second flow path 30, electric conduction through the sample solution SS and the running solution RS in contact with the electrodes 13 to the supply side or the discharge side. As the insulating fluid IF, air is most preferable, but other gas (e.g., nitrogen, carbon dioxide, and the like) or liquid (e.g., vegetable oil, mineral oil, and the like) having high insulating properties may be used. The insulating fluid IF is supplied from the first auxiliary supply source 22 and the second auxiliary supply source 32 to the first flow path 20 and the second flow path 30, respectively. The first auxiliary supply source 22 and the second auxiliary supply source 32 can be implemented with ventilation passages or valves opened to the outside from the first flow path 20 and the second flow path 30, respectively.

The switch 50 switches between supply and stop of fluid at least from the first supply source 21 and the second supply source 31 to the first flow path 20 and the second flow path 30. In other words, the switch 50 is a mechanism interposed between the first supply source 21 and the first flow path 20 and between the second supply source 31 and the second flow path 30, being capable of switching the flow path of the fluid. The switch 50 can be implemented with, for example, a rotary valve, a mechanism in which a plurality of valves are combined, or a mechanism moving a nozzle. As in the present embodiment, the first auxiliary supply source 22 and the second auxiliary supply source 32 may introduce the insulating fluid IF into the first flow path 20 and the second flow path 30 via the switch 50, respectively. In the present embodiment, the first supply source 21 and the second supply source 31, as well as the first auxiliary supply source 22 and the second auxiliary supply source 32, are provided at the supply side of the first flow path 20 and the second flow path 30 via the switch 50.

Moreover, as in the present embodiment, fluid detection sensors 80 configured to detect arrival of fluid may be attached to the first flow path 20 and the second flow path 30. In the present embodiment, a first sensor 82 is provided at each of the supply side and the discharge side with respect to the electrode 13 in the first flow path 20. Moreover, a second sensor 83 is provided at each of the supply side and the discharge side with respect to the electrode 13 in the second flow path 30.

Hereinafter, procedures from supply of the running solution RS and the sample solution SS to execution of electrophoresis in the electrophoresis unit 10 of the present embodiment will be described with reference to FIG. 1B to FIG. 1E.

Figure 1B:
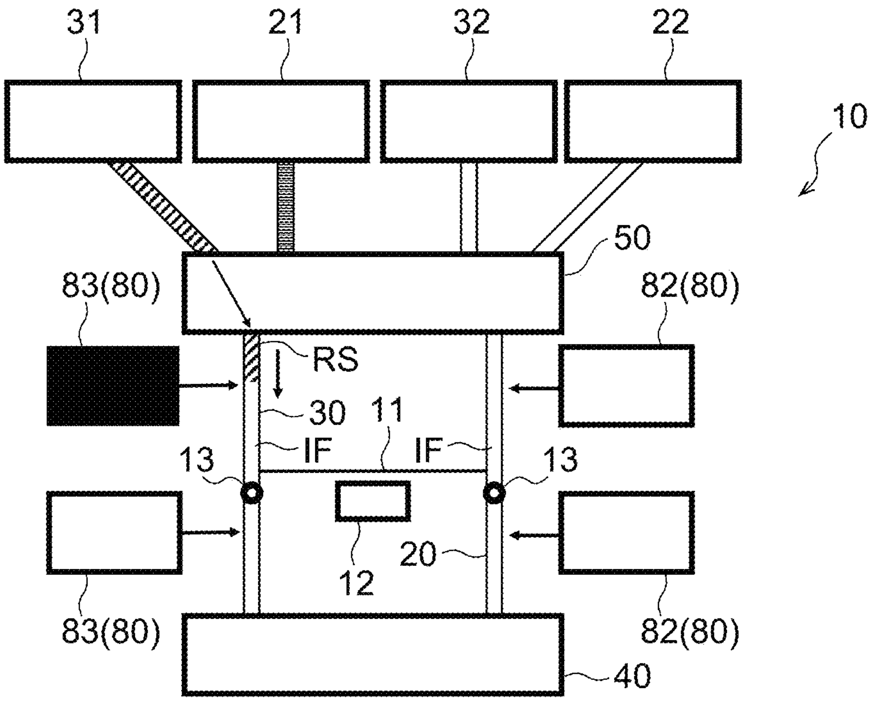
FIG. 1B is a schematic view illustrating a state in which a running solution is introduced into a second flow path in the electrophoresis unit of FIG. 1A.

First, before the running solution RS and the sample solution SS are supplied, each of the first flow path 20 and the second flow path 30 is filled with air serving as insulating fluid IF. From this state, as illustrated in FIG. 1B, the switch 50 connects the second supply source 31 to the second flow path 30, and the running solution RS is supplied to the second flow path 30 by aspiration by the pump 40. Then, when the second sensor 83 at the supply side detects a tip of the running solution RS, the supply of the running solution RS is stopped.

Figure 1C:
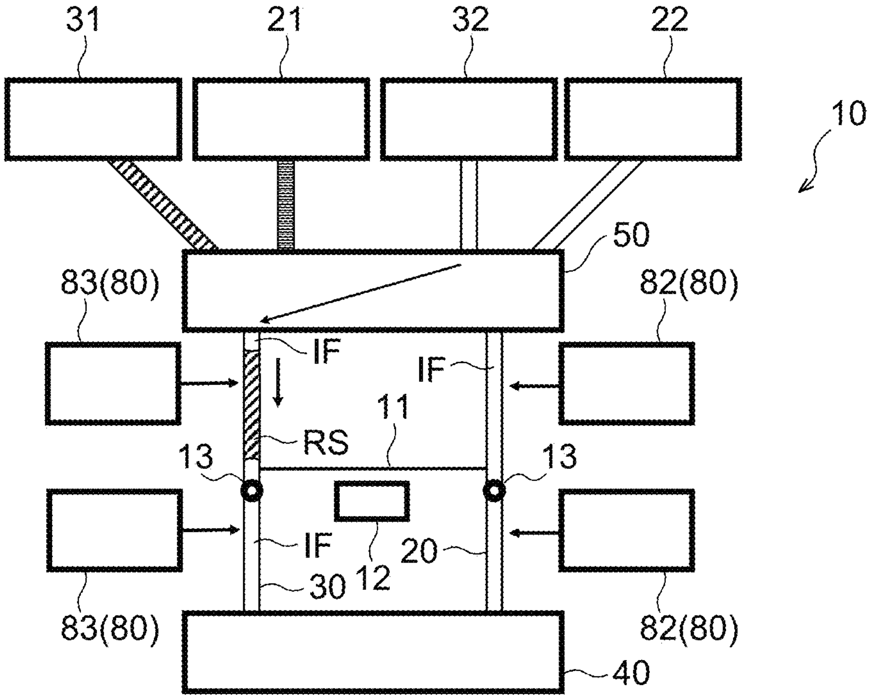
FIG. 1C is a schematic view illustrating a state in which insulating fluid is introduced into the second flow path from the state of FIG. 1B.
Figure 1D:
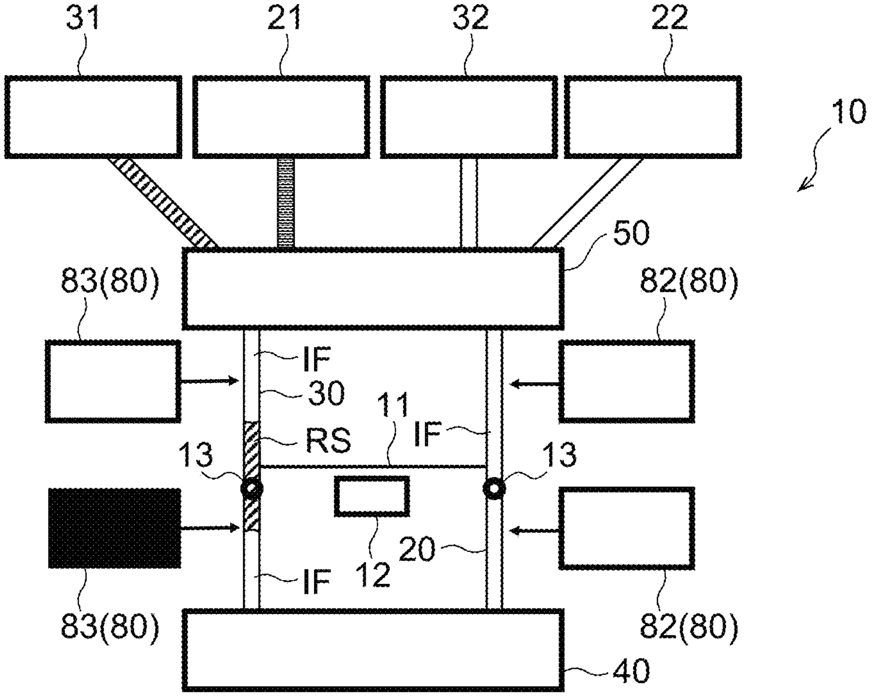
FIG. 1D is a schematic view illustrating a state in which the capillary flow path is filled with the running solution from the state of FIG. 1C.

Next, as illustrated in FIG. 1C, the switch 50 switches the supply sources to connect the second auxiliary supply source 32 to the second flow path 30, and insulating fluid IF is supplied to the second flow path 30 by aspiration by the pump 40. Then, as illustrated in FIG. 1D, when the sensor at the discharge side detects the tip of the running solution RS, the supply of the insulating fluid IF is stopped. In this state, the running solution RS is retained in the downstream side of the capillary flow path 11, and the running solution RS is interposed between the insulating fluid IF located at the supply side and the insulating fluid IF located at the discharge side with respect to the position of the electrode 13. In this state, the running solution RS is introduced into the capillary flow path 11 from the downstream side by a capillary phenomenon, pressurizing, aspirating, or the like. In a case in which the capillary phenomenon is used, it is necessary to open both ends of the capillary flow path 11 to the atmospheric pressure. On the other hand, in a case in which the running solution RS is introduced into the capillary flow path 11 by applying negative pressure or positive pressure, it is necessary to generate a pressure difference between the flow paths at both ends of the capillary.

Figure 1E:
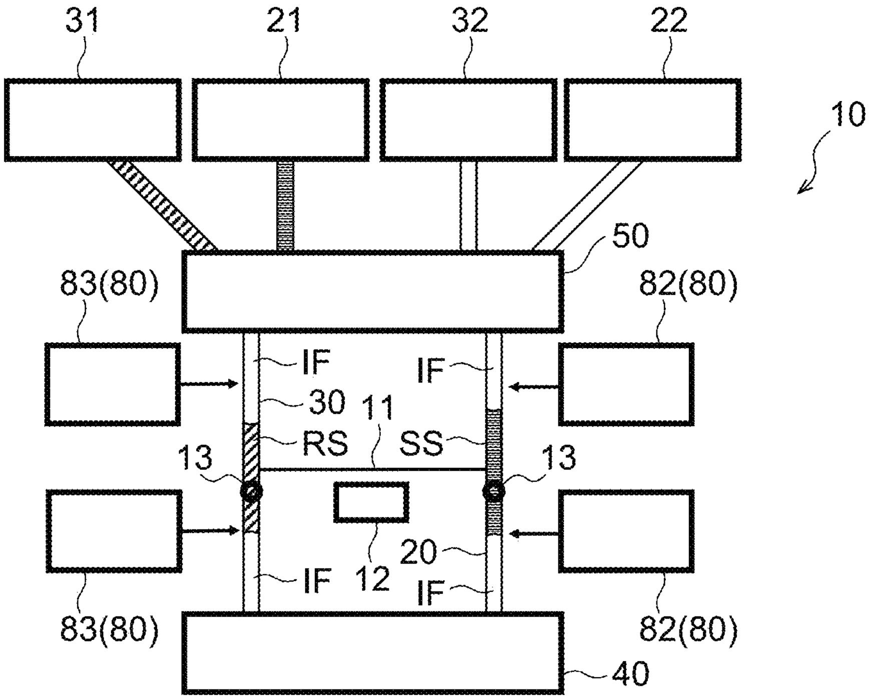
FIG. 1E is a schematic view illustrating a state in which a sample solution and insulating fluid are introduced into the first flow path and electrophoresis is performed from the state of FIG. 1D.

Thereafter, the switch 50 switches the supply sources to connect the first supply source 21 to the first flow path 20, and the sample solution SS is supplied to the first flow path 20 by aspiration by the pump 40. Then, when the first sensor 82 at the supply side detects a tip of the sample solution SS, the supply of the sample solution SS is stopped. Next, the switch 50 switches the supply sources to connect the first auxiliary supply source 22 to the first flow path 20, and insulating fluid IF is supplied to the first flow path 20 by aspiration by the pump 40. Then, as illustrated in FIG. 1E, when the sensor at the discharge side detects the tip of the sample solution SS, the supply of the insulating fluid IF is stopped. In this state, the sample solution SS is retained in the upstream side of the capillary flow path 11, and the sample solution SS is interposed between the insulating fluid IF located at the supply side and the insulating fluid IF located at the discharge side with respect to the position of the electrode 13. In this state, a voltage is applied between the electrodes 13 at both ends of the capillary flow path 11, whereby an electroosmotic flow is generated, so that the sample solution SS moves toward the downstream side in the capillary flow path 11. The components separated by electrophoresis are optically detected by the detector 12. At this time, since the electrodes 13 provided in the first flow path 20 and the second flow path 30 are interposed between the insulating fluid IF on both the supply side and the discharge side, electric leakage from the electrodes 13 to the supply side and the discharge side of the electrophoresis unit 10 can be prevented.

The present embodiment described above implements an electrophoresis method that uses the capillary flow path 11 through which the sample solution SS moves from the upstream side to the downstream side in a state in which the capillary flow path 11 is filled with the running solution, the detector 12 provided at the intermediate part of the capillary flow path 11, the first flow path 20 the intermediate part of which communicates with the upstream side of the capillary flow path 11, the first flow path 20 extending in the direction intersecting the longitudinal direction of the capillary flow path 11, and the second flow path 30 the intermediate part of which communicates with the downstream side of the capillary flow path 11, the second flow path 30 extending in the direction intersecting the longitudinal direction of the capillary flow path 11, the electrophoresis method including: introducing the running solution RS into the second flow path 30; introducing the running solution RS from the second flow path 30 into the capillary flow path 11; introducing the sample solution SS into the first flow path 20; introducing insulating fluid IF into the second flow path 30 so as to interpose the running solution RS at the position in communication with the capillary flow path 11 in the insulating fluid IF; introducing insulating fluid IF into the first flow path 20 so as to interpose the sample solution SS at the position in communication with the capillary flow path 11 in the insulating fluid IF; and applying the voltage between the upstream side and the downstream side of the capillary flow path 11.

In the electrophoresis method described above, it is preferable to further include: introducing insulating fluid IF into the second flow path 30 before and after introducing the running solution RS into the second flow path 30; and introducing insulating fluid IF into the first flow path 20 before and after introducing the sample solution SS into the first flow path 20.

In the present embodiment, since it is not necessary to fill the entire flow path with liquid, the amount of liquid for measurement of the sample by electrophoresis can be minimized. Herein, the volume of the flow path can be appropriately designed. In this case, the electrophoresis unit 10 can also be designed to, after introducing a known amount of fluid is into the flow path, introduce another fluid. The fluid detection sensor 80 described above is unnecessary in this case.

Note that, although, in the present embodiment, the pump 40 is provided as a liquid discharge unit at the discharge side of the first flow path 20 and the second flow path 30, the pump 40 may be provided as part of the composition of the switch 50 at the supply side. Moreover, the first auxiliary supply source 22 and the second auxiliary supply source 32 may be integrated into a single structure to be shared by the first flow path 20 and the second flow path 30.

(2) Second Embodiment

Figure 2A:
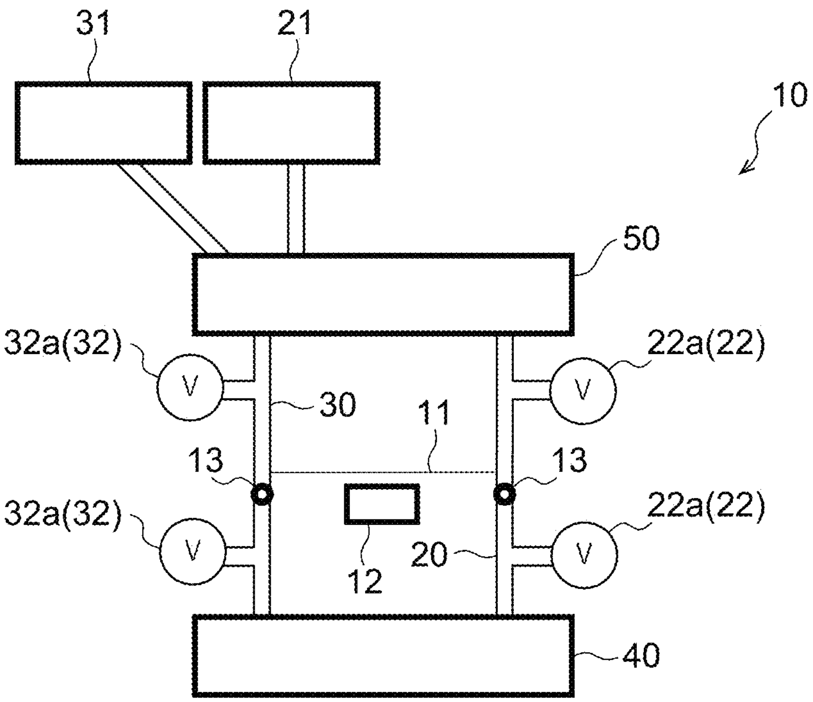
FIG. 2A is a schematic view illustrating an overview of an electrophoresis unit of a second embodiment.

A second embodiment of the present disclosure will be described with reference to FIG. 2A to FIG. 2F. FIG. 2A is a schematic view illustrating an overview of the electrophoresis unit 10 of the second embodiment. Moreover, FIG. 2B to FIG. 2F schematically illustrate a schematic procedure until the running solution RS and the sample solution SS are introduced into the capillary flow path 11 and electrophoresis is performed in the present embodiment.

The configurations of the capillary flow path 11, the detector 12, the first flow path 20, and the second flow path 30, and the meanings of the sample solution SS, the running solution RS, and the insulating fluid IF are the same as those of the first embodiment.

In the present embodiment, the first supply source 21 and the second supply source 31 are provided at the supply side of the first flow path 20 and the second flow path 30 via the switch 50. Similarly to the first embodiment, the pump 40 is provided at the discharge side of the first flow path 20 and the second flow path 30.

In the electrophoresis unit 10 in the present embodiment, a first valve 22*a* configured to open the first flow path 20 to the atmospheric pressure is provided as the first auxiliary supply source 22, and a second valve 32*a* configured to open the second flow path 30 to atmospheric pressure is provided as the second auxiliary supply source 32. In the present embodiment, the first valve 22*a* is provided at each of the supply side and the discharge side with respect to the electrode 13 in the first flow path 20. Moreover, the second valve 32*a* is provided at each of the supply side and the discharge side with respect to the electrode 13 in the second flow path 30.

Hereinafter, procedures from supply of the running solution RS and the sample solution SS to execution of electrophoresis in the electrophoresis unit 10 of the present embodiment will be described with reference to FIG. 2B to FIG. 2F.

Figure 2B:
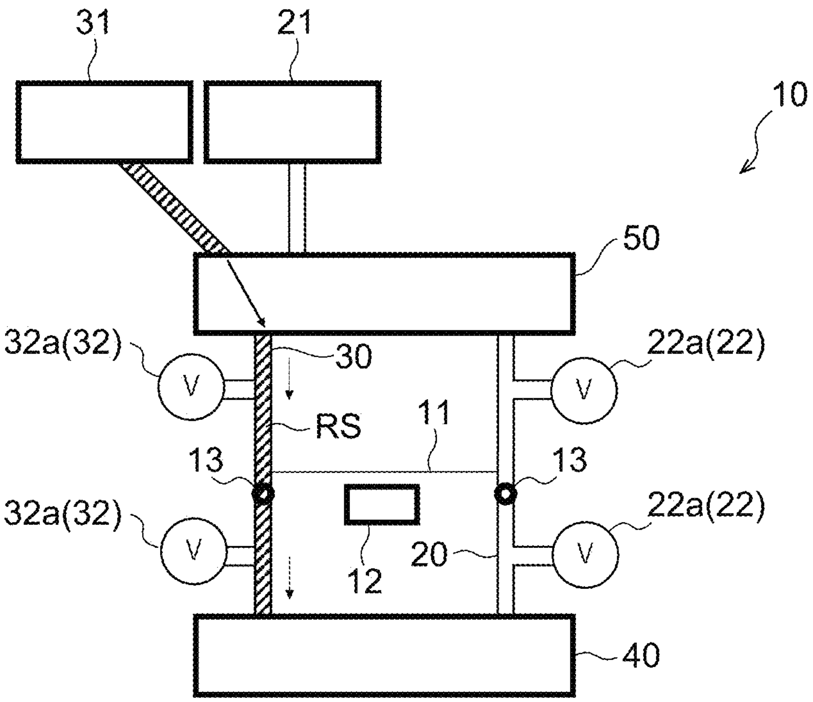
FIG. 2B is a schematic view illustrating a state in which a running solution is introduced into a second flow path in the electrophoresis unit of FIG. 2A.

First, as illustrated in FIG. 2B, the switch 50 connects the second supply source 31 to the second flow path 30 to open the flow path, and the running solution RS is supplied to the second flow path 30 by aspiration by the pump 40. When the second flow path 30 is filled with the running solution RS, the switch 50 closes the flow path to stop the supply of the running solution RS.

Figure 2C:
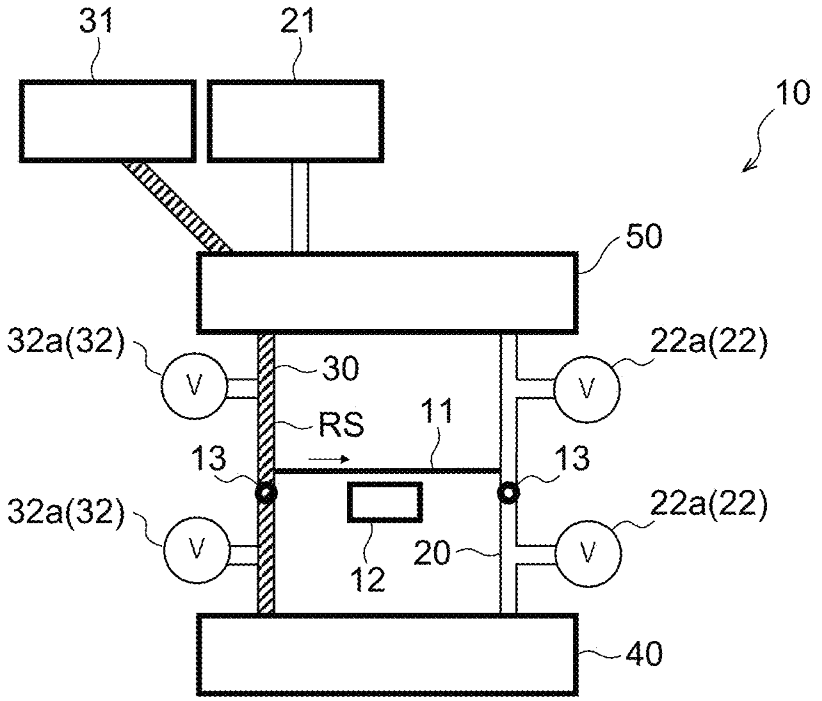
FIG. 2C is a schematic view illustrating a state in which a capillary flow path is filled with the running solution from the state of FIG. 2B.

Next, as illustrated in FIG. 2C, the running solution RS is introduced into the capillary flow path 11 from the downstream side by a capillary phenomenon, pressurizing, aspirating, or the like. In a case in which the capillary phenomenon is used, it is necessary to open both ends of the capillary flow path 11 to the atmospheric pressure. On the other hand, in a case in which the running solution RS is introduced into the capillary flow path 11 by applying negative pressure or positive pressure, it is necessary to generate a pressure difference between the flow paths at both ends of the capillary.

Figure 2D:
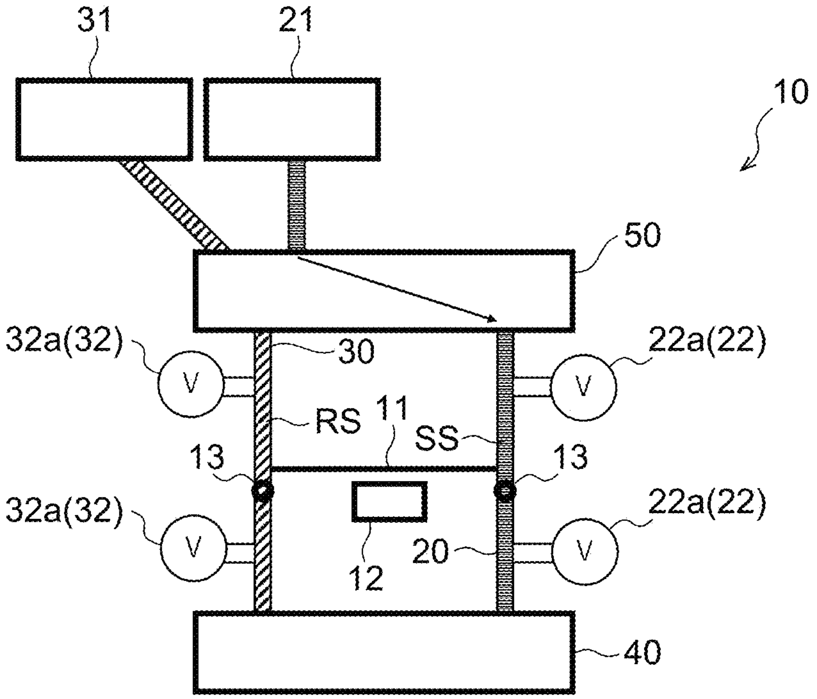
FIG. 2D is a schematic view illustrating a state in which a sample solution is introduced into a first flow path from the state of FIG. 2C.

Next, as illustrated in FIG. 2D, the switch 50 connects the first supply source 21 to the first flow path 20 to open the flow path, and the sample solution SS is supplied to the first flow path 20 by aspiration by the pump 40. When the first flow path 20 is filled with the sample solution SS, the switch 50 closes the flow path to stop the supply of the sample solution SS.

Figure 2E:
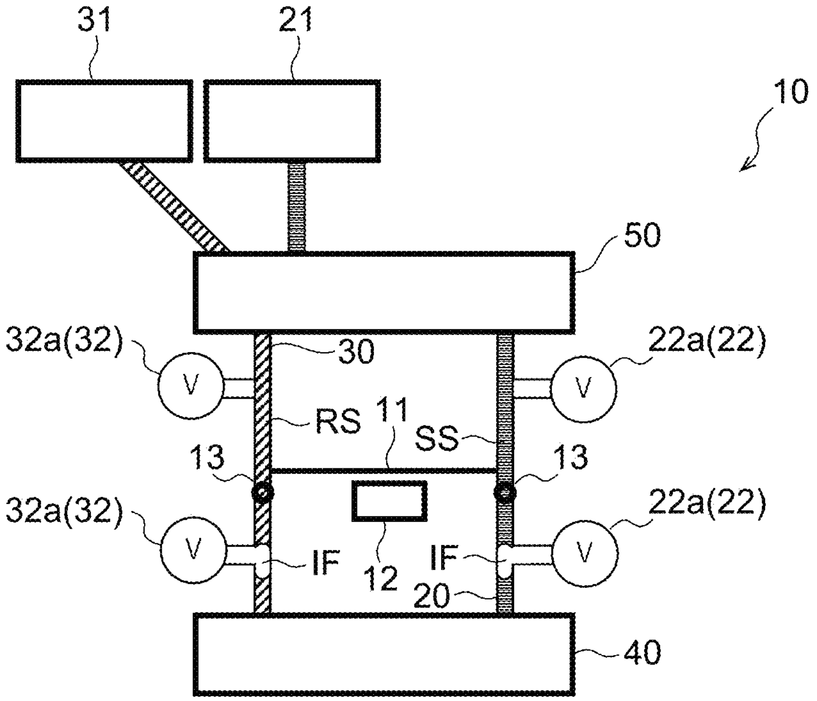
FIG. 2E is a schematic view illustrating a state in which insulating fluid is introduced into the first flow path and the second flow path from the state of FIG. 2D.

Subsequently, as illustrated in FIG. 2E, in the first flow path 20 and the second flow path 30, the first valve 22*a* and the second valve 32*a* at the discharge side are opened, and insulating fluid IF (e.g., air) is introduced from the outside at the discharge side with respect to each of the electrodes 13 of the first flow path 20 and the second flow path 30. Herein, since the supply side of the first flow path 20 and the supply side of the second flow path 30 are closed spaces, the fluid in the capillary flow path 11 does not move. Then, the first valve 22*a* and the second valve 32*a* at the discharge side are closed.

Figure 2F:
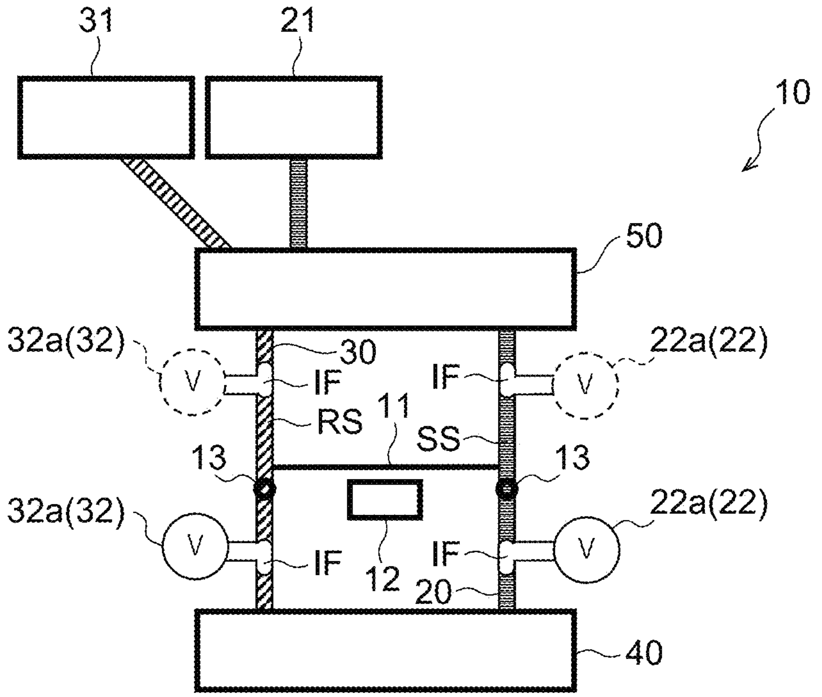
FIG. 2F is a schematic view illustrating a state in which the first flow path and the second flow path are opened to outside air pressure and electrophoresis is performed from the state of FIG. 2E.

Then, as illustrated in FIG. 2F, in the first flow path 20 and the second flow path 30, the first supply source 21 and the second supply source 31 are communicated with each other by opening of the switch 50, and at the same time, the first valve 22*a* and the second valve 32*a* at the supply side are opened, and insulating fluid IF (e.g., air) is introduced from the outside at the supply side with respect to each of the electrodes 13 of the first flow path 20 and the second flow path 30. After the insulating fluid IF is introduced, in the first flow path 20 and the second flow path 30, the communication with the first supply source 21 and the communication with the second supply source 31 are blocked by closing of the switch 50. In this way, by opening the first valve 22*a* and the second valve 32*a* at the supply side of the first flow path 20 and the second flow path 30, both ends of the capillary flow path 11 are opened to the atmospheric pressure, and the external force due to the differential pressure with the outside air pressure does not act on the fluid in the capillary flow path 11.

In this stage, the running solution RS is retained in the downstream side of the capillary flow path 11, and the running solution RS is interposed between the insulating fluid IF located at the supply side and the insulating fluid IF located at the discharge side with respect to the position of the electrode 13. At the same time, the sample solution SS is retained in the upstream side of the capillary flow path 11, and the sample solution SS is interposed between the insulating fluid IF located at the supply side and the insulating fluid IF located at the discharge side with respect to the position of the electrode 13. In this state, a voltage is applied between the electrodes 13 at both ends of the capillary flow path 11, whereby an electroosmotic flow is generated, so that the sample solution SS moves toward the downstream side in the capillary flow path 11. The components separated by electrophoresis are optically detected by the detector 12. At this time, since the electrodes 13 provided in the first flow path 20 and the second flow path 30 are interposed between the insulating fluid IF on both the supply side and the discharge side, electric leakage from the electrodes 13 to the supply side and the discharge side of the electrophoresis unit 10 can be prevented.

The present embodiment described above implements an electrophoresis method that uses the capillary flow path 11 through which the sample solution SS moves from the upstream side to the downstream side, the detector 12 provided at the intermediate part of the capillary flow path 11, the first flow path 20, the intermediate part of which communicates with the upstream side of the capillary flow path 11, the first flow path 20 extending in the direction intersecting the longitudinal direction of the capillary flow path 11, and the second flow path 30 the intermediate part of which communicates with the downstream side of the capillary flow path 11, the second flow path 30 extending in the direction intersecting the longitudinal direction of the capillary flow path 11, the electrophoresis method including: introducing the running solution RS into the second flow path 30; introducing the running solution RS from the second flow path 30 into the capillary flow path 11; introducing the sample solution SS into the first flow path 20; introducing insulating fluid IF into the second flow path 30 so as to interpose the running solution RS at the position in communication with the capillary flow path 11 in the insulating fluid IF; introducing insulating fluid IF into the first flow path 20 so as to interpose the sample solution SS at the position in communication with the capillary flow path 11 in the insulating fluid IF; and applying the voltage between the upstream side and the downstream side of the capillary flow path 11.

In the electrophoresis method described above, it is preferable to include: introducing the running solution RS into the second flow path 30 and then introducing the insulating fluid IF so as to interpose the position in communication with the capillary flow path 11 in the insulating fluid IF; and introducing the sample solution SS into the first flow path 20 and then introducing insulating fluid IF so as to interpose the position in communication with the capillary flow path 11 in the insulating fluid IF.

Note that, although, in the present embodiment, the pump 40 is provided as a liquid discharge unit at the discharge side of the first flow path 20 and the second flow path 30, the pump 40 may be provided as part of the composition of the switch 50 at the supply side.

(3) Third Embodiment

Figure 3A:
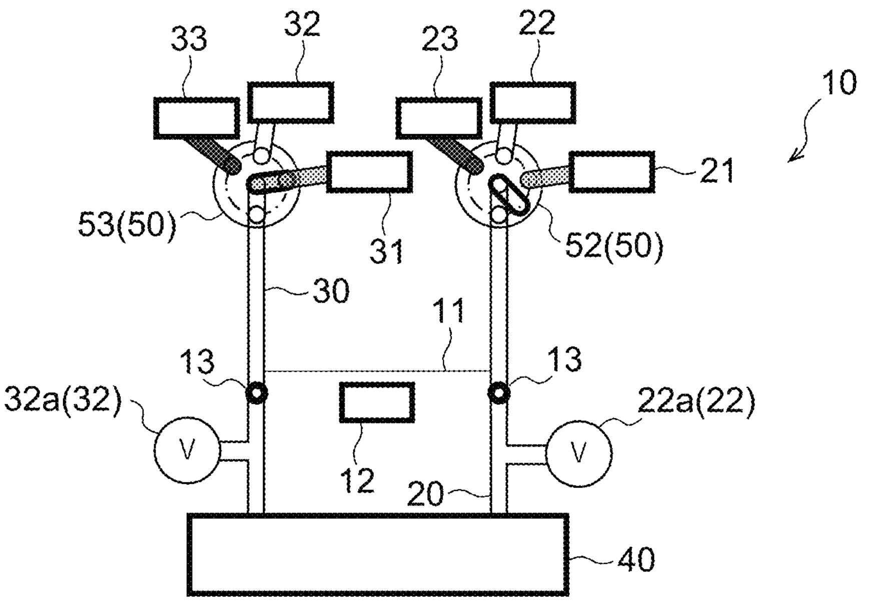
FIG. 3A is a schematic view illustrating an overview of an electrophoresis unit of a third embodiment.

A third embodiment of the present disclosure will be described with reference to FIG. 3A to FIG. 3G. FIG. 3A is a schematic view illustrating an overview of the electrophoresis unit 10 of the third embodiment. Moreover, FIG. 3B to FIG. 3G schematically illustrate a schematic procedure until the running solution RS and the sample solution SS are introduced into the capillary flow path 11 and electrophoresis is performed in the present embodiment.

The configurations of the capillary flow path 11, the detector 12, the first flow path 20, and the second flow path 30, and the meanings of the sample solution SS, the running solution RS, and the insulating fluid IF are the same as those of the first embodiment.

In the present embodiment, the first supply source 21, the first auxiliary supply source 22, and a cleaning liquid supply source 23 are provided at the supply side of the first flow path 20 via a first switch 52 serving as the switch 50. Moreover, the second supply source 31, the second auxiliary supply source 32, and a cleaning liquid supply source 33 are provided at the supply side of the second flow path 30 via a second switch 53 serving as the switch 50. The first auxiliary supply source 22 and the second auxiliary supply source 32 have the same meaning as in the first embodiment. Both the first switch 52 and the second switch 53 include a rotary valve, a mechanism in which a plurality of valves are combined, or a mechanism moving a nozzle.

The cleaning liquid supply sources 23, 33 supply cleaning liquid CL for cleaning the first flow path 20, the second flow path 30, and the capillary flow path 11 after the end of electrophoresis, to the first flow path 20 and the second flow path 30, respectively. As the cleaning liquid CL, for example, liquid in which a surfactant is added to appropriate buffer solution or the like can be used. That is, in the present embodiment, the cleaning liquid CL is introduced into the first flow path 20 via the switch 50 after the sample solution SS is introduced into the first flow path 20, and the cleaning liquid CL is introduced into the second flow path 30 via the switch 50 after the running solution RS is introduced into the second flow path 30.

Moreover, in the present embodiment, the first valve 22*a* configured to open the first flow path 20 to atmospheric pressure is further provided as the first auxiliary supply source 22 at the discharge side with respect to the position of the electrode 13, and the second valve 32*a* configured to open the second flow path 30 to the atmospheric pressure is further provided as the second auxiliary supply source 32 at the discharge side with respect to the position of the electrode 13. Similarly to the first embodiment, the pump 40 is provided at the discharge side of the first flow path 20 and the second flow path 30.

Hereinafter, from supply of the running solution RS and the sample solution SS to execution of electrophoresis in the electrophoresis unit 10 of the present embodiment will be described with reference to FIG. 3B to FIG. 3G.

Figure 3B:
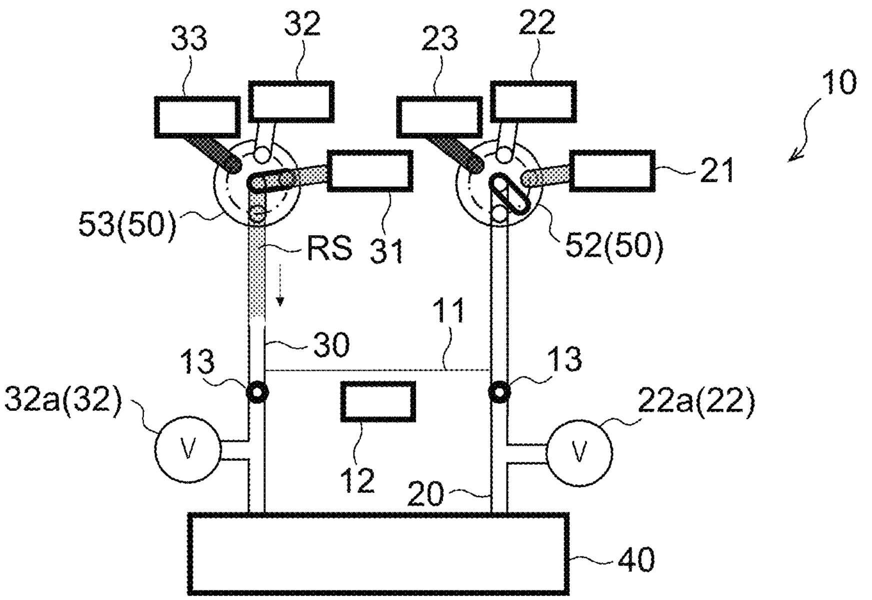
FIG. 3B is a schematic view illustrating a state in which a running solution is introduced into a second flow path in the electrophoresis unit of FIG. 3A.
Figure 3C:
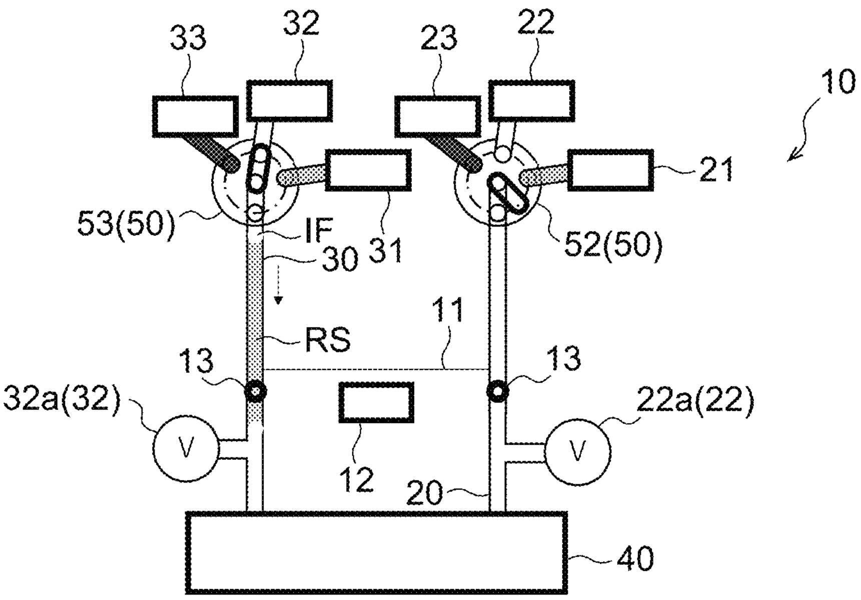
FIG. 3C is a schematic view illustrating a state in which insulating fluid is introduced into the second flow path from the state of FIG. 3B.

First, as illustrated in FIG. 3B, the second switch 53 connects the second supply source 31 to the second flow path 30, and the running solution RS is supplied to the second flow path 30 by aspiration by the pump 40. Subsequently, as illustrated in FIG. 3C, the second switch 53 switches the supply sources to connect the second auxiliary supply source 32 to the second flow path 30, and aspiration by the pump 40 supplies insulating fluid IF to the second flow path 30.

Figure 3D:
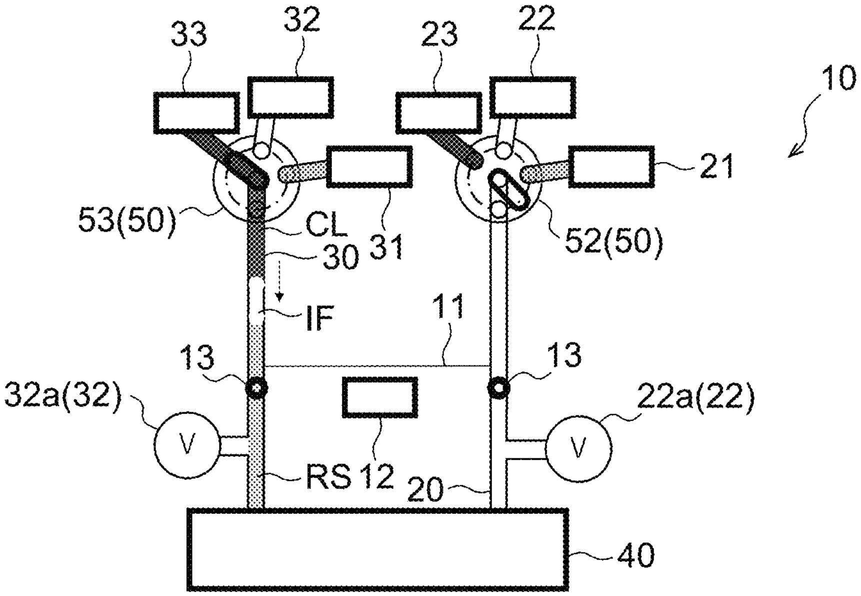
FIG. 3D is a schematic view illustrating a state in which cleaning liquid is introduced into the second flow path from the state of FIG. 3C.
Figure 3E:
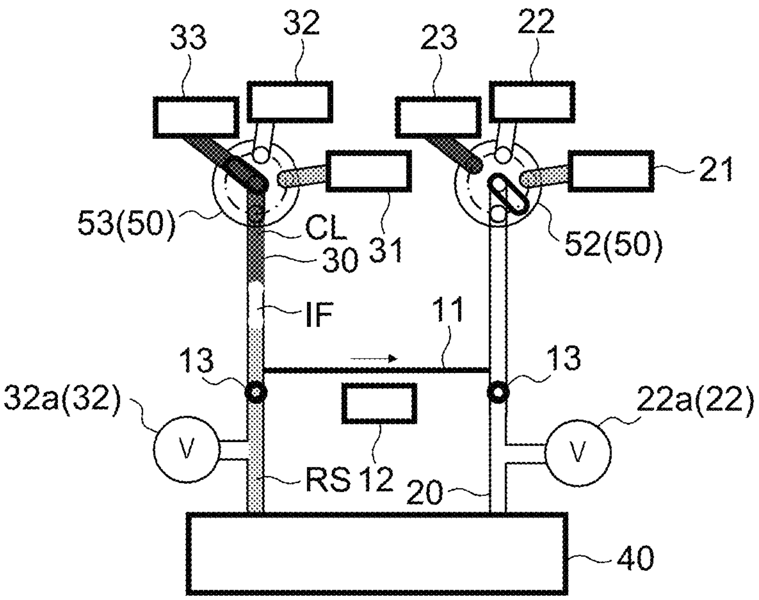
FIG. 3E is a schematic view illustrating a state in which a capillary flow path is filled with the running solution from the state of FIG. 3D.

Next, as illustrated in FIG. 3D, the second switch 53 switches the supply sources to connect the cleaning liquid supply source 33 to the second flow path 30, and the cleaning liquid CL is supplied to the second flow path 30 by aspiration by the pump 40. Then, as illustrated in FIG. 3E, the running solution RS is introduced into the capillary flow path 11 from the downstream side by a capillary phenomenon, pressurizing, aspirating, or the like. In a case in which the capillary phenomenon is used, it is necessary to open both ends of the capillary flow path 11 to the atmospheric pressure. On the other hand, in a case in which the running solution RS is introduced into the capillary flow path 11 by applying negative pressure or positive pressure, it is necessary to generate a pressure difference between the flow paths at both ends of the capillary.

Figure 3F:
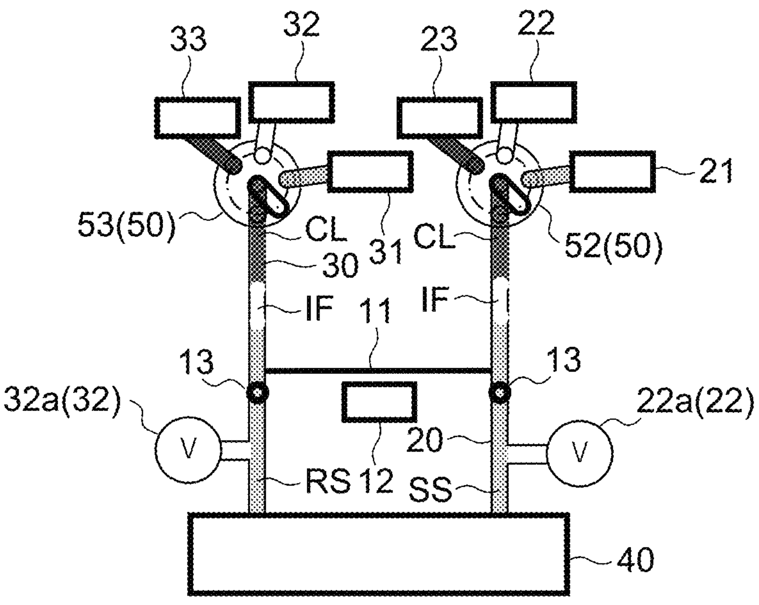
FIG. 3F is a schematic view illustrating a state in which a sample solution, insulating fluid, and the cleaning liquid are introduced into the first flow path in this order from the state of FIG. 3E.

From this state, the first switch 52 connects the first supply source 21 to the first flow path 20, and the sample solution SS is supplied to the first flow path 20 by aspiration by the pump 40. Subsequently, the first switch 52 switches the supply sources to connect the first auxiliary supply source 22 to the first flow path 20, and insulating fluid IF is supplied to the first flow path 20 by aspiration by the pump 40. Next, the first switch 52 switches the supply sources to connect the cleaning liquid supply source 23 to the first flow path 20, and the cleaning liquid CL is supplied to the first flow path 20 by aspiration by the pump 40. Then, as illustrated in FIG. 3F, both the first switch 52 and the second switch 53 transition to a closed state, and the supply side of the first flow path 20 and the supply side of the second flow path 30 become closed spaces.

Figure 3G:
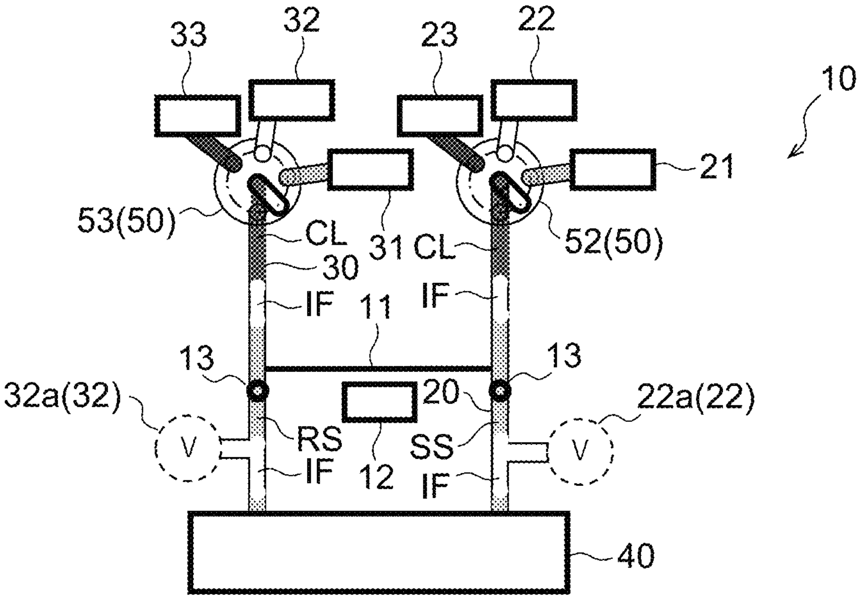
FIG. 3G is a schematic view illustrating a state in which, the first flow path and the second flow path are opened to outside air pressure while insulating fluid is introduced into the first flow path and the second flow path, and electrophoresis is performed from the state of FIG. 3F.

Subsequently, as illustrated in FIG. 3G, in the first flow path 20 and the second flow path 30, the first valve 22*a* and the second valve 32*a* at the discharge side are opened, and insulating fluid IF is introduced from the outside at the discharge side with respect to each of the electrodes 13 of the first flow path 20 and the second flow path 30. In this way, by opening the first valve 22*a* and the second valve 32*a* at the discharge side in the first flow path 20 and the second flow path 30, both ends of the capillary flow path 11 are opened to the atmospheric pressure, and the external force due to the differential pressure with the outside air pressure does not act on the fluid in the capillary flow path 11.

In this state, a voltage is applied between the electrodes 13 at both ends of the capillary flow path 11, whereby an electroosmotic flow is generated, so that the sample solution SS moves toward the downstream side in the capillary flow path 11. The components separated by electrophoresis are optically detected by the detector 12. At this time, since the electrodes 13 provided in the first flow path 20 and the second flow path 30 are interposed between the insulating fluid IF on both the supply side and the discharge side, electric leakage from the electrodes 13 to the supply side and the discharge side of the electrophoresis unit 10 can be prevented.

After the electrophoresis is completed, aspiration in the first flow path 20 and the second flow path 30 by the pump 40 can cause the first flow path 20, the second flow path 30, and the capillary flow path 11 to be cleaned with the cleaning liquid CL.

The present embodiment described above implements an electrophoresis method that uses the capillary flow path 11 through which the sample solution SS moves from the upstream side to the downstream side, the detector 12 provided at the intermediate part of the capillary flow path 11, the first flow path 20, the intermediate part of which communicates with the upstream side of the capillary flow path 11, the first flow path 20 extending in the direction intersecting the longitudinal direction of the capillary flow path 11, and the second flow path 30, the intermediate part of which communicates with the downstream side of the capillary flow path 11, the second flow path 30 extending in the direction intersecting the longitudinal direction of the capillary flow path 11, the electrophoresis method including: introducing the running solution RS into the second flow path 30; introducing the running solution RS from the second flow path 30 into the capillary flow path 11; introducing the sample solution SS into the first flow path 20; introducing insulating fluid IF into the second flow path 30 so as to interpose the running solution RS at the position in communication with the capillary flow path 11 in the insulating fluid IF; introducing insulating fluid IF into the first flow path 20 so as to interpose the sample solution SS at the position in communication with the capillary flow path 11 in the insulating fluid IF; and applying the voltage between the upstream side and the downstream side of the capillary flow path 11.

In the electrophoresis method described above, it is preferable to further include: introducing insulating fluid IF into the second flow path 30 after introducing the running solution RS into the second flow path 30, and with respect to the insulating fluid IF, further introducing insulating fluid IF into the second flow path 30 so as to interpose the position in communication with the capillary flow path 11 in the insulating fluid IF; and introducing insulating fluid IF into the first flow path 20 after introducing the sample solution SS into the first flow path 20, and with respect to the insulating fluid IF, further introducing insulating fluid IF into the first flow path 20 so as to interpose the position in communication with the capillary flow path 11 in the insulating fluid IF.

In the electrophoresis method described above, it is preferable to further include: introducing the cleaning liquid CL into the second flow path 30 after introducing the running solution RS into the second flow path 30; and introducing the cleaning liquid CL into the first flow path 20 after introducing the sample solution SS into the first flow path 20.

Note that, although, in the present embodiment, the pump 40 is provided as a liquid discharge unit at the discharge side of the first flow path 20 and the second flow path 30, the pump 40 may be provided as part of the composition of the switch 50 at the supply side. The first auxiliary supply source 22 and the second auxiliary supply source 32 may be integrated into a single structure to be shared by the first flow path 20 and the second flow path 30. The two cleaning liquid supply sources 23, 33 may be integrated into a single structure to be shared by the first flow path 20 and the second flow path 30.

(4) Fourth Embodiment

Figure 4A:
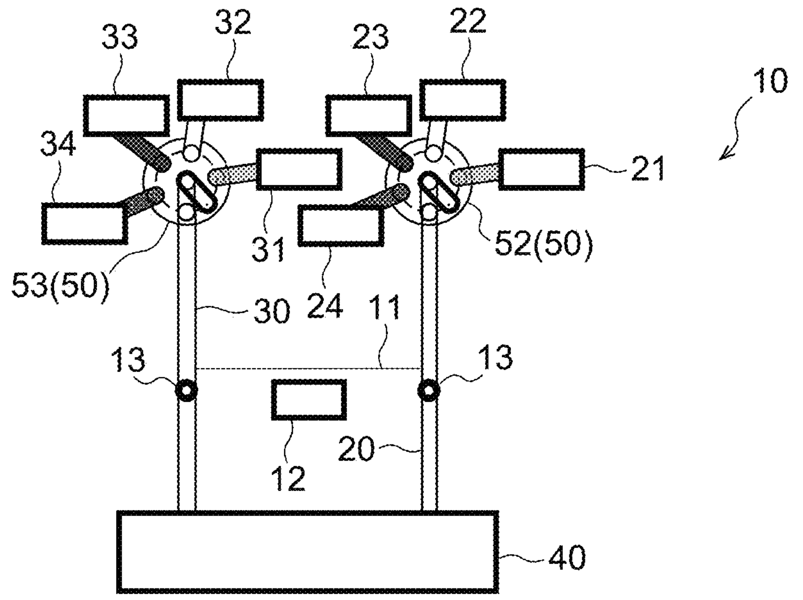
FIG. 4A is a schematic view illustrating an overview of an electrophoresis unit of a fourth embodiment.

A fourth embodiment of the disclosure will be described with reference to FIG. 4A to FIG. 4H. FIG. 4A is a schematic view illustrating an overview of the electrophoresis unit 10 of the fourth embodiment. Moreover, FIG. 4B to FIG. 4H schematically illustrate a schematic procedure until the running solution RS and the sample solution SS are introduced into the capillary flow path 11 and electrophoresis is performed in the present embodiment.

The configurations of the capillary flow path 11, the detector 12, the first flow path 20, and the second flow path 30, and the meanings of the sample solution SS, the running solution RS, and the insulating fluid IF are the same as those of the first embodiment.

In the present embodiment, the first supply source 21, the first auxiliary supply source 22, the cleaning liquid supply source 23, and a pre-cleaning liquid supply source 24 are provided at the supply side of the first flow path 20 via the first switch 52 serving as the switch 50. Moreover, the second supply source 31, the second auxiliary supply source 32, the cleaning liquid supply source 33, and a pre-cleaning liquid supply source 34 are provided at the supply side of the second flow path 30 via the second switch 53 serving as the switch 50. The first auxiliary supply source 22 and the second auxiliary supply source 32 have the same meaning as in the first embodiment. Both the first switch 52 and the second switch 53 include a rotary valve, a mechanism in which a plurality of valves are combined, or a mechanism moving a nozzle.

The pre-cleaning liquid supply sources 24, 34 supply pre-cleaning liquid pCL for cleaning the first flow path 20 and the second flow path 30 before the start of electrophoresis to the first flow path 20 and the second flow path 30, respectively. The cleaning liquid supply sources 23, 33 supply cleaning liquid CL for cleaning the first flow path 20, the second flow path 30, and the capillary flow path 11 after the end of electrophoresis, to the first flow path 20 and the second flow path 30, respectively. As the cleaning liquid CL and the pre-cleaning liquid pCL, for example, liquid in which a surfactant is added to appropriate buffer solution or the like can be used. That is, in the present embodiment, the pre-cleaning liquid pCL is introduced into the first flow path 20 via the switch 50 before the sample solution SS is introduced into the first flow path 20, and the pre-cleaning liquid pCL is introduced into the second flow path 30 via the switch 50 before the running solution RS is introduced into the second flow path 30. Furthermore, in the present embodiment, the cleaning liquid CL is introduced into the first flow path 20 via the switch 50 after the sample solution SS is introduced into the first flow path 20, and the cleaning liquid CL is introduced into the second flow path 30 via the switch 50 after the running solution RS is introduced into the second flow path 30.

Hereinafter, procedures from supply of the running solution RS and the sample solution SS to execution of electrophoresis in the electrophoresis unit 10 of the present embodiment will be described with reference to FIG. 4B to FIG. 4H.

Figure 4B:
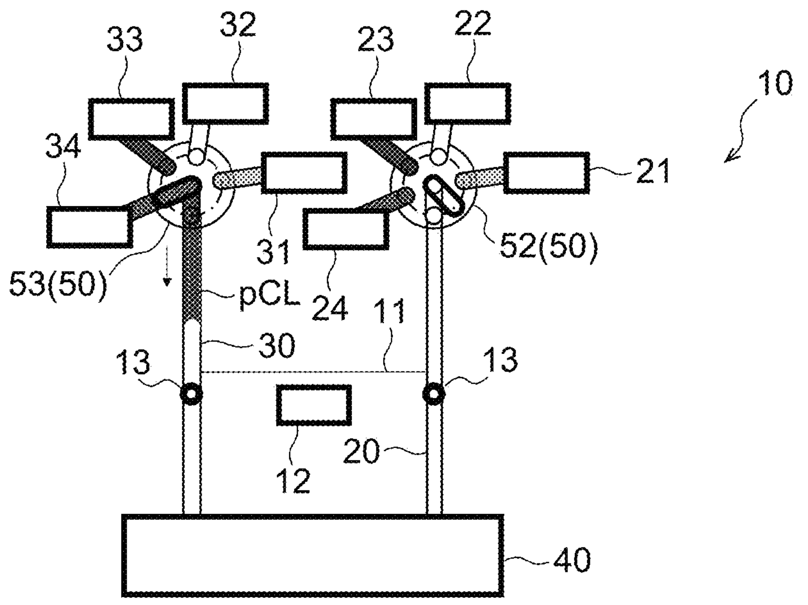
FIG. 4B is a schematic view illustrating a state in which pre-cleaning liquid is introduced into a second flow path in the electrophoresis unit of FIG. 4A.
Figure 4C:
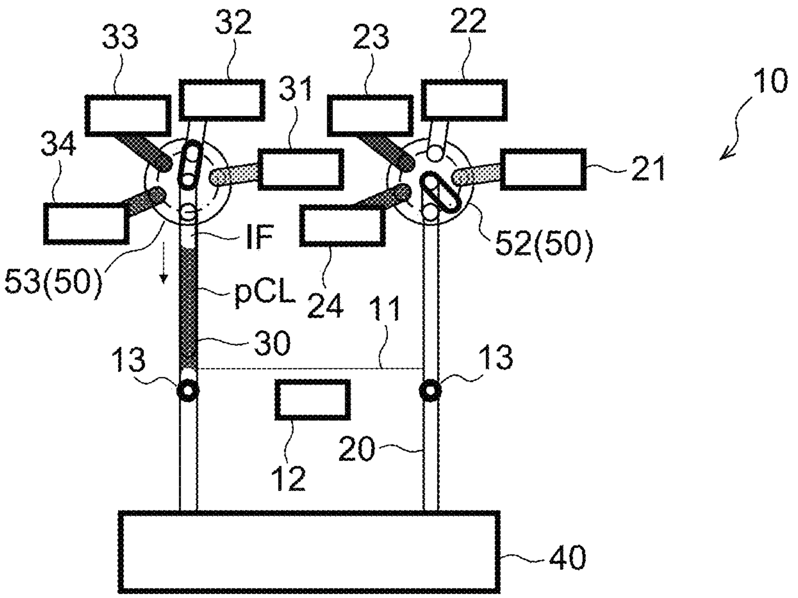
FIG. 4C is a schematic view illustrating a state in which insulating fluid is introduced into the second flow path from the state of FIG. 4B.

First, as illustrated in FIG. 4B, the second switch 53 connects the pre-cleaning liquid supply source 34 to the second flow path 30, and the pre-cleaning liquid pCL is supplied to the second flow path 30 by aspiration by the pump 40. Subsequently, as illustrated in FIG. 4C, the second switch 53 switches the supply sources to connect the second auxiliary supply source 32 to the second flow path 30, and insulating fluid IF is supplied to the second flow path 30 by aspiration by the pump 40.

Figure 4D:
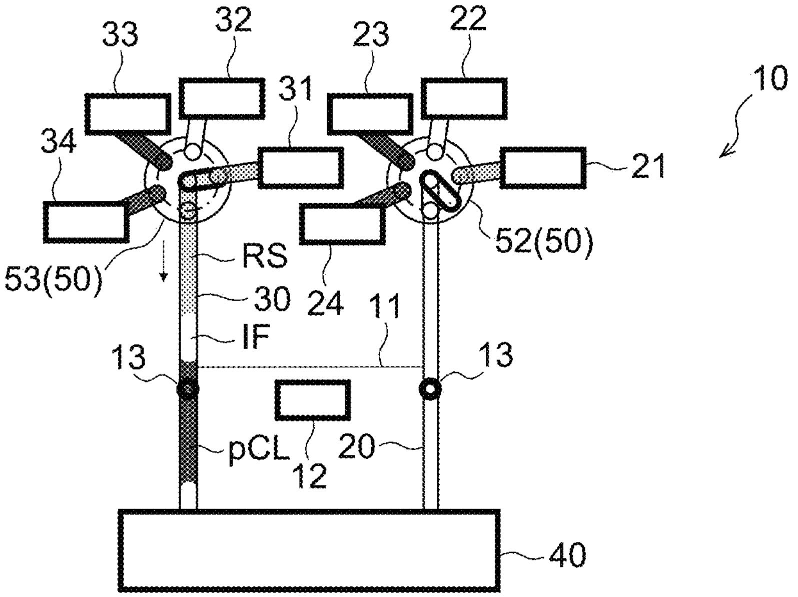
FIG. 4D is a schematic view illustrating a state in which a running solution is introduced into the second flow path from the state of FIG. 4C.
Figure 4E:
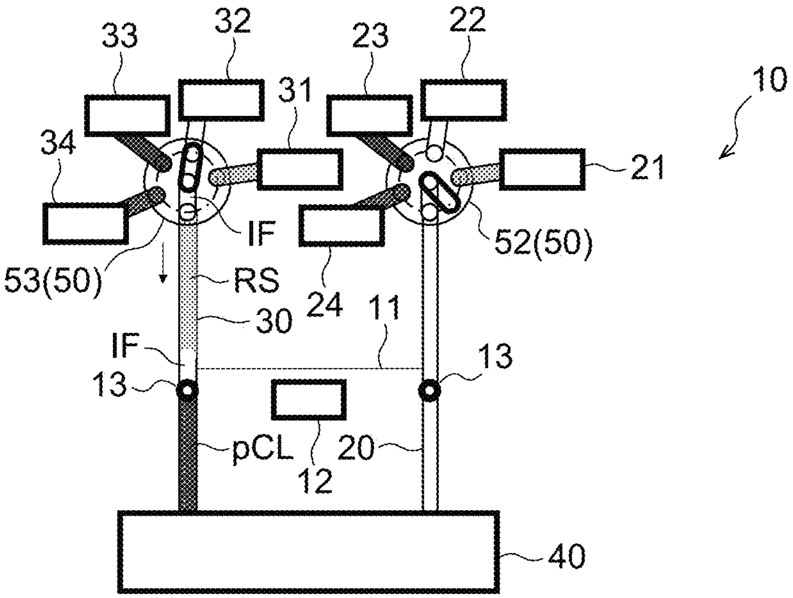
FIG. 4E is a schematic view illustrating a state in which insulating fluid is introduced again into the second flow path from the state of FIG. 4D.

Next, as illustrated in FIG. 4D, switching the supply sources, the second switch 53 connects the second supply source 31 to the second flow path 30, and the running solution RS is supplied to the second flow path 30 by aspiration by the pump 40. Subsequently, as illustrated in FIG. 4E, the second switch 53 switches the supply sources to connect the second auxiliary supply source 32 to the second flow path 30, and insulating fluid IF is supplied to the second flow path 30 by aspiration by the pump 40.

Figure 4F:
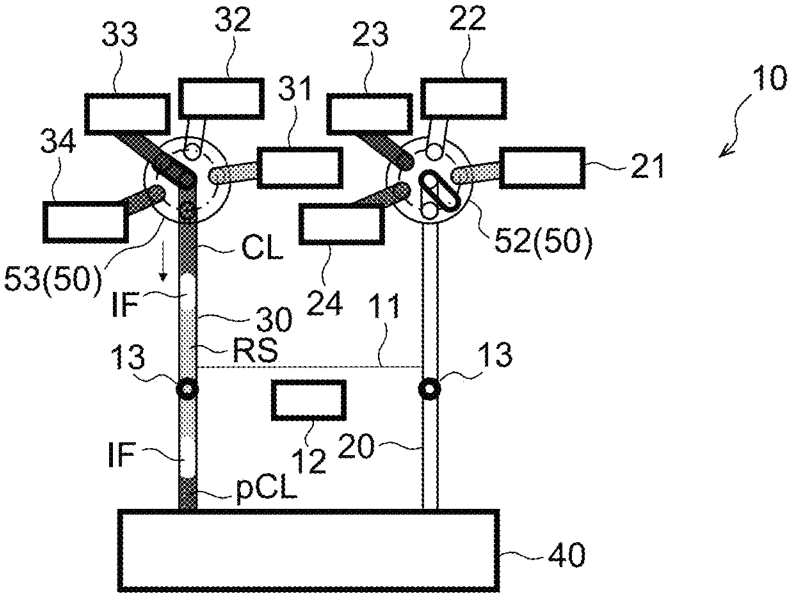
FIG. 4F is a schematic view illustrating a state in which cleaning liquid is introduced into the second flow path from the state of FIG. 4E.
Figure 4G:
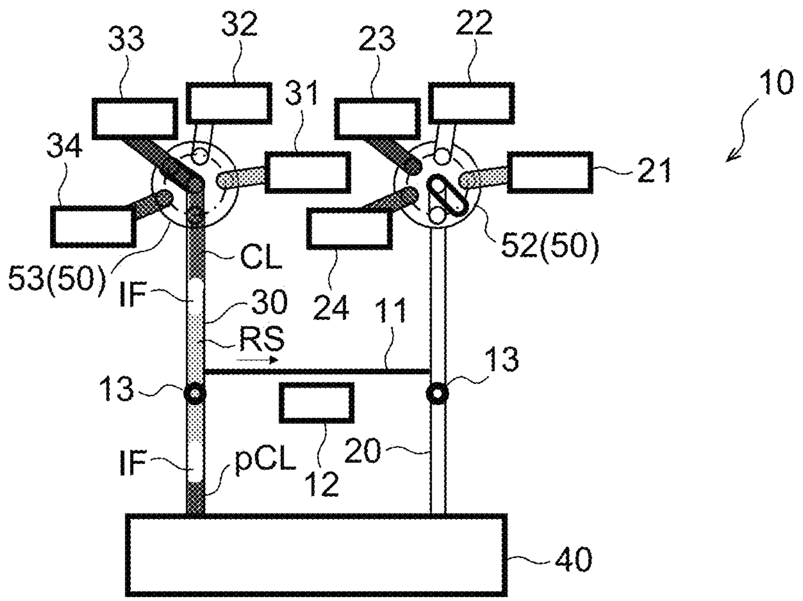
FIG. 4G is a schematic view illustrating a state in which a capillary flow path is filled with the running solution from the state of FIG. 4F.

Next, as illustrated in FIG. 4F, the second switch 53 switches the supply sources to connect the cleaning liquid supply source 33 to the second flow path 30, and the cleaning liquid CL is supplied to the second flow path 30 by aspiration by the pump 40. As illustrated in FIG. 4G, the running solution RS is introduced into the capillary flow path 11 from the downstream side by a capillary phenomenon, pressurizing, aspirating, or the like. In a case in which the capillary phenomenon is used, it is necessary to open both ends of the capillary flow path 11 to the atmospheric pressure. On the other hand, in a case in which the running solution RS is introduced into the capillary flow path 11 by applying negative pressure or positive pressure, it is necessary to generate a pressure difference between the flow paths at both ends of the capillary.

From this state, the first switch 52 connects the pre-cleaning liquid supply source 24 to the first flow path 20, and the pre-cleaning liquid pCL is supplied to the first flow path 20 by aspiration by the pump 40. Subsequently, the first switch 52 switches the supply sources to connect the first auxiliary supply source 22 to the first flow path 20, and insulating fluid IF is supplied to the first flow path 20 by aspiration by the pump 40. Next, switching the supply sources, the first switch 52 connects the first supply source 21 to the first flow path 20, and the sample solution SS is supplied to the first flow path 20 by aspiration by the pump 40. Subsequently, the first switch 52 switches the supply sources to connect the first auxiliary supply source 22 to the first flow path 20, and insulating fluid IF is supplied to the first flow path 20 by aspiration by the pump 40. Then, the first switch 52 switches the supply sources to connect the cleaning liquid supply source 23 to the first flow path 20, and the cleaning liquid CL is supplied to the first flow path 20 by aspiration by the pump 40.

Figure 4H:
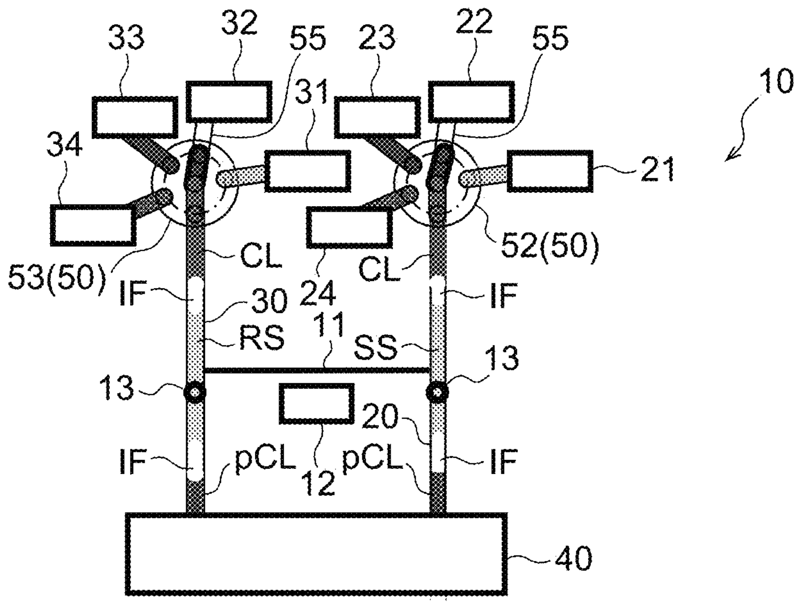
FIG. 4H is a schematic view illustrating a state in which the pre-cleaning liquid, insulating fluid, the sample solution, insulating fluid, and the cleaning liquid are introduced into the first flow path in this order, subsequently the first flow path and the second flow path are opened to outside air pressure, and electrophoresis is performed from the state of FIG. 4G.

In this state, as illustrated in FIG. 4H, the first switch 52 connects the first flow path 20 to the first auxiliary supply source 22, so that the supply side of the first flow path 20 becomes an open path 55 opened to the atmospheric pressure. Similarly, as illustrated in FIG. 4H, the second switch 53 connects the second flow path 30 to the second auxiliary supply source 32, so that the supply side of the second flow path 30 also becomes an open path 55 opened to the atmospheric pressure. In this way, the supply side of the first flow path 20 and the supply side of the second flow path 30 become the open paths 55 and are opened to the atmospheric pressure, so that the external force due to the differential pressure with the outside air pressure does not act on the fluid in the capillary flow path 11. That is, in the electrophoresis unit 10 of the present embodiment, the switch 50 is capable of switching each of the first flow path 20 and the second flow path 30 to the open path 55 to be opened to the atmospheric pressure.

In the state illustrated in FIG. 4H, a voltage is applied between the electrodes 13 at both ends of the capillary flow path 11, whereby an electroosmotic flow is generated, so that the sample solution SS moves toward the downstream side in the capillary flow path 11. The components separated by electrophoresis are optically detected by the detector 12. At this time, since the electrodes 13 provided in the first flow path 20 and the second flow path 30 are interposed between the insulating fluid IF on both the supply side and the discharge side, electric leakage from the electrodes 13 to the supply side and the discharge side of the electrophoresis unit 10 can be prevented.

Then, after the electrophoresis is completed, aspiration in the first flow path 20 and the second flow path 30 by the pump 40 can cause the first flow path 20, the second flow path 30, and the capillary flow path 11 to be cleaned with the cleaning liquid CL.

The present embodiment described above implements an electrophoresis method that uses the capillary flow path 11 through which the sample solution SS moves from the upstream side to the downstream side, the detector 12 provided at the intermediate part of the capillary flow path 11, the first flow path 20, the intermediate part of which communicates with the upstream side of the capillary flow path 11, the first flow path 20 extending in the direction intersecting the longitudinal direction of the capillary flow path 11, and the second flow path 30, the intermediate part of which communicates with the downstream side of the capillary flow path 11, the second flow path 30 extending in the direction intersecting the longitudinal direction of the capillary flow path 11, the electrophoresis method including: introducing the running solution RS into the second flow path 30; introducing the running solution RS from the second flow path 30 into the capillary flow path 11; introducing the sample solution SS into the first flow path 20; introducing insulating fluid IF into the second flow path 30 so as to interpose the running solution RS at the position in communication with the capillary flow path 11 in the insulating fluid IF; introducing insulating fluid IF into the first flow path 20 so as to interpose the sample solution SS at the position in communication with the capillary flow path 11 in the insulating fluid IF; and applying the voltage between the upstream side and the downstream side of the capillary flow path 11.

In the electrophoresis method described above, it is preferable to further include: introducing insulating fluid IF into the second flow path 30 after introducing the running solution RS into the second flow path 30, and with respect to the insulating fluid IF, further introducing insulating fluid IF into the second flow path 30 so as to interpose the position in communication with the capillary flow path 11 in the insulating fluid IF; and introducing insulating fluid IF into the first flow path 20 after introducing the sample solution SS into the first flow path 20, and with respect to the insulating fluid IF, further introducing insulating fluid IF into the first flow path 20 so as to interpose the position in communication with the capillary flow path 11 in the insulating fluid IF.

In the electrophoresis method described above, it is preferable to further include: introducing the cleaning liquid CL into the second flow path 30 after introducing the running solution RS into the second flow path 30; and introducing the cleaning liquid CL into the first flow path 20 after introducing the sample solution SS into the first flow path 20.

In the electrophoresis method described above, it is preferable to further include: introducing the pre-cleaning liquid pCL into the second flow path 30 before introducing the running solution RS into the second flow path 30; and introducing the pre-cleaning liquid pCL into the first flow path 20 before introducing the sample solution SS into the first flow path 20.

Note that, although, in the present embodiment, the pump 40 is provided as a liquid discharge unit at the discharge side of the first flow path 20 and the second flow path 30, the pump 40 may be provided as part of the composition of the switch 50 at the supply side. The first auxiliary supply source 22 and the second auxiliary supply source 32 may be integrated into a single structure to be shared by the first flow path 20 and the second flow path 30. The two cleaning liquid supply sources 23, 33 may be integrated into a single structure to be shared by the first flow path 20 and the second flow path 30. The two pre-cleaning liquid supply sources 24, 34 may be integrated into a single structure to be shared by the first flow path 20 and the second flow path 30.

INDUSTRIAL APPLICABILITY

The technique of the present disclosure can be utilized for an electrophoresis unit and an electrophoresis method that perform capillary electrophoresis.

What is claimed is:

1. An electrophoresis unit, comprising:

a capillary flow path through which a sample solution moves from an upstream side to a downstream side in a state in which the capillary flow path is filled with a running solution;

a pair of electrodes installed near both ends of the capillary flow path;

a detector provided at an intermediate part of the capillary flow path;

a first flow path, an intermediate part of which communicates with the upstream side of the capillary flow path, the first flow path extending in a direction intersecting a longitudinal direction of the capillary flow path;

a second flow path, an intermediate part of which communicates with the downstream side of the capillary flow path, the second flow path extending in the direction intersecting the longitudinal direction;

a first supply source configured to supply the sample solution to the first flow path;

a second supply source configured to supply the running solution to the second flow path;

a pump configured to move the running solution from the second supply source to the second flow path and to move the sample solution from the first supply source to the first flow path;

a first auxiliary supply source configured to supply, to the first flow path, insulating fluid that insulates the sample solution in contact with the electrode in the first flow path;

a second auxiliary supply source configured to supply, to the second flow path, insulating fluid that insulates the running solution in contact with the electrode in the second flow path; and a switch configured to switch between supply and stop of fluid at least from the first supply source and the second supply source to the first flow path and the second flow path.

2. The electrophoresis unit according to claim 1, wherein the first auxiliary supply source and the second auxiliary supply source introduce the insulating fluid into the first flow path and the second flow path, via the switch, respectively.

3. The electrophoresis unit according to claim 2, wherein a fluid detection sensor configured to detect arrival of fluid is attached to each of the first flow path and the second flow path.

4. The electrophoresis unit according to claim 1, wherein:

a first valve configured to open the first flow path to atmospheric pressure is provided as the first auxiliary supply source, and a second valve configured to open the second flow path to atmospheric pressure is provided as the second auxiliary supply source.

5. The electrophoresis unit according to claim 2, wherein:

a first valve configured to open the first flow path to atmospheric pressure is provided as the first auxiliary supply source, and a second valve configured to open the second flow path to atmospheric pressure is provided as the second auxiliary supply source.

6. The electrophoresis unit according to claim 2, wherein the switch is capable of switching each of the first flow path and the second flow path to an open path to be opened to atmospheric pressure.

7. The electrophoresis unit according to claim 1, wherein:

a cleaning liquid is introduced into the first flow path, via the switch, after the sample solution is introduced into the first flow path, and the cleaning liquid is introduced into the second flow path, via the switch, after the running solution is introduced into the second flow path.

8. The electrophoresis unit according to claim 7, wherein:

a pre-cleaning liquid is introduced into the first flow path, via the switch, before the sample solution is introduced into the first flow path, and the pre-cleaning liquid is introduced into the second flow path, via the switch, before the running solution is introduced into the second flow path.

9. An electrophoresis method that uses a capillary flow path through which a sample solution moves from an upstream side to a downstream side in a state in which the capillary flow path is filled with a running solution, a detector provided at an intermediate part of the capillary flow path, a first flow path, an intermediate part of which communicates with the upstream side of the capillary flow path, the first flow path extending in a direction intersecting a longitudinal direction of the capillary flow path, and a second flow path, an intermediate part of which communicates with the downstream side of the capillary flow path, the second flow path extending in the direction intersecting the longitudinal direction, the electrophoresis method comprising:

introducing the running solution into the second flow path;

introducing the running solution from the second flow path into the capillary flow path;

introducing the sample solution into the first flow path;

introducing insulating fluid into the second flow path so as to interpose the running solution, at a position in communication with the capillary flow path, in the insulating fluid;

introducing insulating fluid into the first flow path so as to interpose the sample solution, at a position in communication with the capillary flow path, in the insulating fluid; and applying a voltage between the upstream side and the downstream side of the capillary flow path.

10. The electrophoresis method according to claim 9, further comprising:

introducing the insulating fluid into the second flow path before and after introducing the running solution into the second flow path; and introducing the insulating fluid into the first flow path before and after introducing the sample solution into the first flow path.

11. The electrophoresis method according to claim 9, further comprising:

introducing the running solution into the second flow path and then introducing the insulating fluid so as to interpose the position in communication with the capillary flow path in the insulating fluid; and introducing the sample solution into the first flow path and then introducing the insulating fluid so as to interpose the position in communication with the capillary flow path in the insulating fluid.

12. The electrophoresis method according to claim 9, further comprising:

introducing the insulating fluid into the second flow path after introducing the running solution into the second flow path, and with respect to the insulating fluid, further introducing the insulating fluid into the second flow path so as to interpose the position in communication with the capillary flow path in the insulating fluid; and introducing the insulating fluid into the first flow path after introducing the sample solution into the first flow path, and with respect to the insulating fluid, further introducing the insulating fluid into the first flow path so as to interpose the position in communication with the capillary flow path in the insulating fluid.

13. The electrophoresis method according to claim 9, further comprising:

introducing a cleaning liquid into the second flow path after introducing the running solution into the second flow path; and introducing the cleaning liquid into the first flow path after introducing the sample solution into the first flow path.

14. The electrophoresis method according to claim 13, further comprising:

introducing a pre-cleaning liquid into the second flow path before introducing the running solution into the second flow path; and introducing the pre-cleaning liquid into the first flow path before introducing the sample solution into the first flow path.

* * * * *